United States Patent [19]

Beuk et al.

[11] Patent Number: 5,446,266
[45] Date of Patent: Aug. 29, 1995

[54] SECURITY SYSTEM FOR AN APPARATUS

[75] Inventors: Leonardus G. M. Beuk; Bert J. Kalisvaart, both of Eindhoven, Netherlands

[73] Assignee: U.S. Philips Corporation, New York, N.Y.

[21] Appl. No.: 239,162

[22] Filed: May 6, 1994

Related U.S. Application Data

[63] Continuation of Ser. No. 922,299, Jul. 30, 1992, abandoned.

[30] Foreign Application Priority Data

Aug. 1, 1991 [EP] European Pat. Off. ............ 91201992

[51] Int. Cl.6 .......................... G06K 5/00; G06K 7/01
[52] U.S. Cl. ................................. 235/382.5; 235/382
[58] Field of Search ............... 235/375, 379, 380, 382, 235/382.5; 340/825.31, 825.32, 825.30, 825.34, 426, 427, 428, 429, 430; 364/424.05

[56] References Cited

U.S. PATENT DOCUMENTS

| | | | |
|---|---|---|---|
| 3,996,450 | 12/1976 | Kerkchoff | 235/380 |
| 4,095,739 | 6/1978 | Fox et al. | 235/382 |
| 4,614,861 | 9/1986 | Pavlov et al. | 235/380 |
| 4,801,787 | 1/1989 | Suzuki | 235/382.5 X |
| 4,962,449 | 10/1990 | Schlesinger | 235/382 X |
| 5,187,352 | 2/1993 | Blair et al. | 235/382.5 |

FOREIGN PATENT DOCUMENTS

| | | | |
|---|---|---|---|
| 0392411 | 4/1990 | European Pat. Off. | |
| 2217885 | 11/1989 | United Kingdom | G06K 5/00 |
| 8403785 | 9/1984 | WIPO | |

Primary Examiner—Aristotelis Psitos
Assistant Examiner—Patrick Wamsley
Attorney, Agent, or Firm—Michael J. Balconi-Lamica; Anne E. Barschall

[57] ABSTRACT

A smart card security system has a system code and a security code. By means of a unique card containing the system code, the security code can be changed. Any card containing the correct security code renders the apparatus to be protected operable. The holder of the card bearing the system code can temporarily authorize other users to operate the apparatus.

15 Claims, 2 Drawing Sheets

SECURITY SYSTEM FOR AN APPARATUS

This is a continuation of application Ser. No. 07/922,299 filed on Jul. 30, 1992 now abandoned.

BACKGROUND OF THE INVENTION

The invention relates to a security system for an apparatus, said system comprising a control device for receiving a data carrier containing a security code, for reading said security code, and for rendering the apparatus operable in dependence on the validity of said security code.

Such a security system is known from the UK Patent Application GB 2 217 885 A. Herein a security system is described in which the insertion of a unique, electronically encoded card into a control unit triggers this control unit to render the otherwise inoperable apparatus operable. The electronically encoded card is unique to the apparatus and contains a unique security code, for example the registration number or the manufacturer's serial number of the apparatus. Without the card the apparatus cannot be operated.

Such a security system has several drawbacks: when the unique encoded card is lost or stolen, security is no longer guaranteed. Furthermore it is not very practical: authorizing someone to operate the apparatus can only be effected by handing over the unique encoded card. This increases the risk of loss or theft.

BRIEF SUMMARY OF THE INVENTION

It is inter alia an object of the invention to provide a more flexible security system in which the above-mentioned drawbacks are mitigated. To achieve this object, a security system according to the invention is characterized in that said control device is suitable for, upon reception of a unique system data carrier containing a system code, displaying said security code and enabling the changing of said security code, in dependence on the validity of said system code. The security code can thus be changed when a data carrier is lost or stolen. Only the unique system data carrier with the system code has to be kept safely. Loss or theft of a data carrier containing the security code has no serious consequences, because the security code can be changed easily. Besides, authorizing someone to operate the apparatus can easily be effected by giving him or her a data carrier with the currently valid security code. Cancelling the authorization does not necessitate the handing back of this data carrier, but can be effected by changing the security code by means of the unique system data carrier.

The data carriers used can be of the smart card type, optionally containing data representing user-specific apparatus settings. For example, if the apparatus is a car radio, the smart card may contain data concerning preferred radio stations. If the apparatus is a car telephone, the smart card may contain data representing names and telephone numbers for short dialling. If the apparatus is a car, the smart card may contain data representing preferred steering wheel positions and/or front seat positions. Of course, the invention is also applicable to other kinds of apparatus.

In an embodiment of the invention the security system is characterized in that said control device is suitable for, upon reception of a data carrier containing an invalid security code, enabling the entering of a further security code via a keypad. This offers even higher flexibility: a user can be authorized to operate the apparatus by communicating to him or her the currently valid security code.

In a further embodiment of the invention the security system is characterized in that said control device is suitable for, upon determining that said entered further security code is invalid, enabling the entering of a still further security code via the keypad after a predetermined time interval. Thus an inadvertently entered invalid code can be corrected.

In a further embodiment of the invention the security system is characterized in that said predetermined time interval is increased each time an entered security code is found to be invalid. In this way unauthorized operation of the apparatus by trial-and-error is counteracted.

BRIEF DESCRIPTION OF DRAWING

The invention will now be described in further detail with reference to the accompanying drawings, in which.

DETAILED DESCRIPTION OF THE INVENTION

Figure 1:
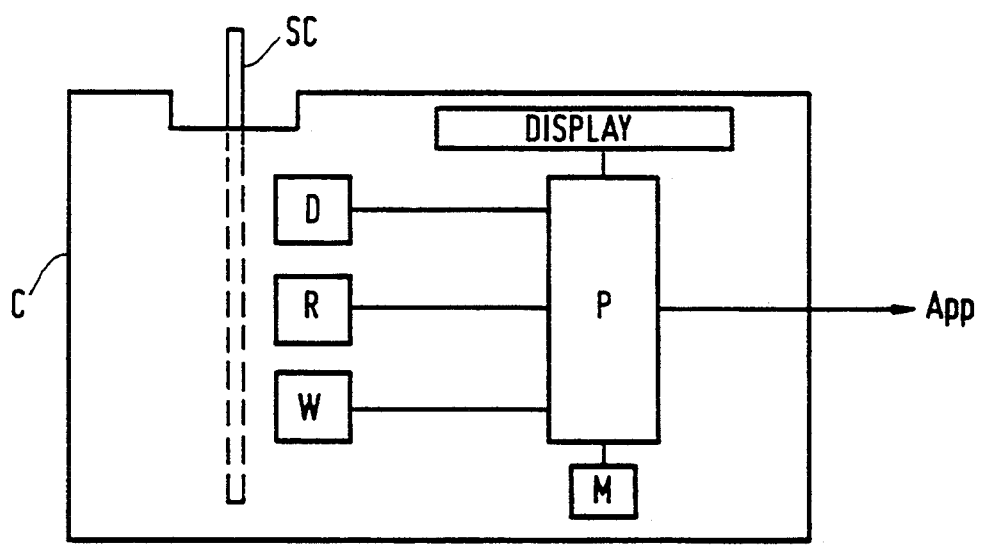
FIG. 1 shows schematically a system according to the invention.

In FIG. 1 a security system is shown comprising a control device C which is connectable to an apparatus to be protected. The control device comprises detecting means D, reading means R, writing means W, a microprocessor P, a memory M and a DISPLAY. When a data carrier SC, for example a smart card, is inserted into the control device, the detecting means D (optionally comprised in the reading means R) detect whether the card is the unique system data carrier or not. This information is transferred to the micro-processor P. The reading means R are arranged to read the system code if the inserted card is the unique system card as well as to read the security code if the inserted card is a different card bearing a security code. The micro-processor P can compare a code read by the reading means R with a corresponding code in the memory M. The memory M contains the system code and the currently valid security code, adequately protected. Optionally provided writing means W are arranged to write a manually entered correct security code onto the inserted smart card should this card contain an invalid security code, as will be explained in detail further on. In dependence on the inputs from the detecting means D and the reading means R, the micro-processor P generates messages to the user on the DISPLAY. The operation of the system will now be described in more detail with reference to FIG. 2.

Figure 2:
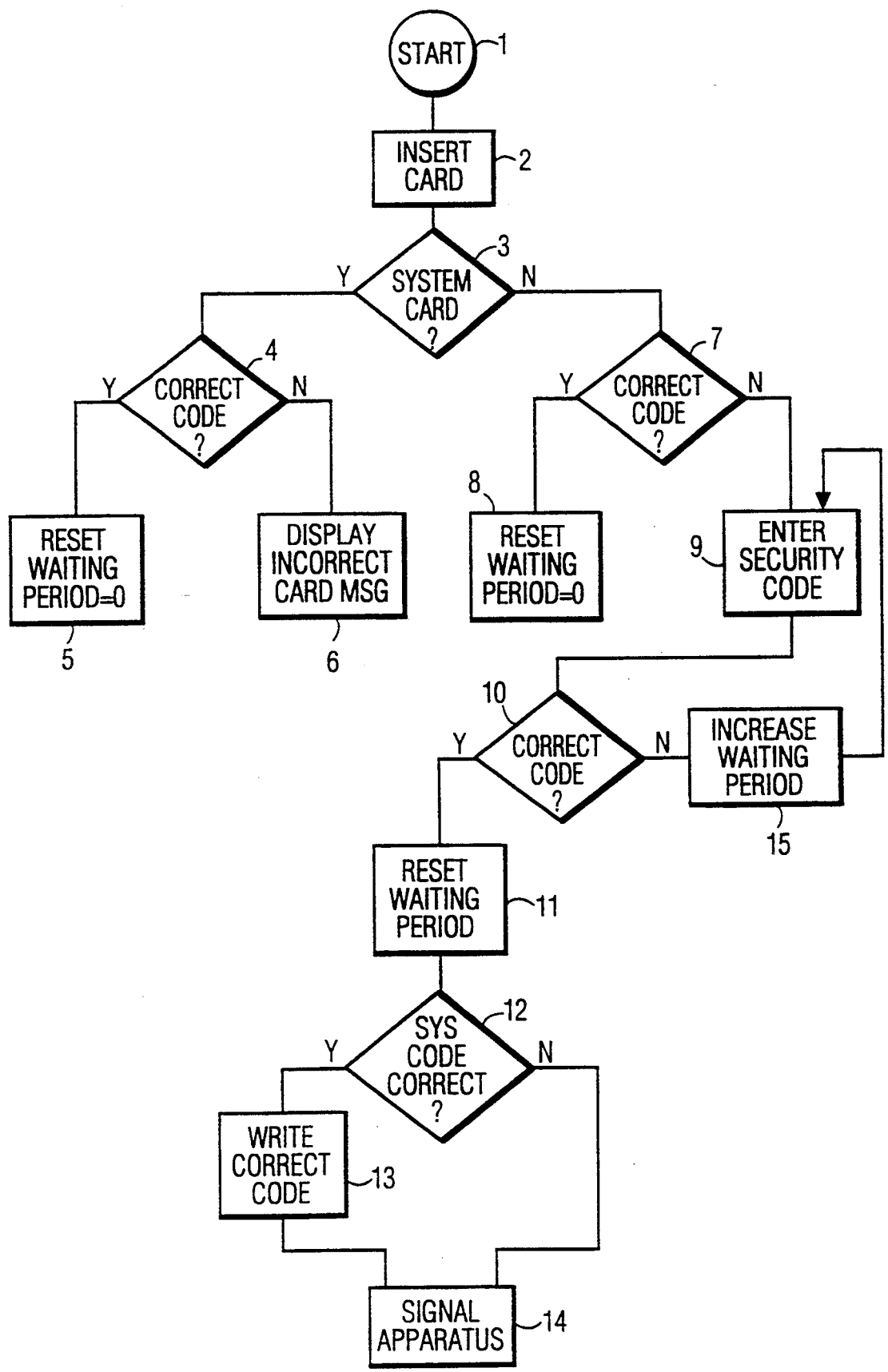
FIG. 2 is a flow chart illustrating the operation of the system.

In the flow chart of FIG. 2 the first step (in block 2) is the insertion of a card by a user in a slot in the control device C. When no card is inserted in the control device, the connected apparatus to be protected is always inoperable. The detecting means D determine in block 3 whether the inserted card is the unique system card or not. If the system card was inserted, then in block 4 the micro-processor P determines if the system code SYSC on the inserted system card is correct by comparing the code on the card (read by the reading means) with the valid system code stored in the memory M. If the system code is correct (block 5), the micro-processor resets to zero any waiting period imposed by attempts to start up the system by means of an invalid card. Furthermore, under the control of the micro-processor, the DISPLAY shows the currently valid security code, a (for example numerical) keypad and a message: "Enter new security code or remove card". The user can enter (manually for example, or by means of a voice recognition device) a new security code of, for example, 4 numerals. If the system code SYSC on the inserted card was not correct (block 6), a system card of another security system is concerned. The DISPLAY shows the message: "This is not the correct card for this system".

If the inserted card is not the unique system card, then in block 7 the micro-processor P determines if the security code SECC on the inserted card is correct, by comparing the code on the card (read by the reading means) with the currently valid security code stored in the memory M. If the security code is correct (block 8), the micro-processor resets to zero any waiting period imposed by attempts to start up the system by means of an invalid card. Furthermore, the micro-processor generates a signal that renders the apparatus to which the control device is connected operable. If the security code on the inserted card is not correct (block 9), the micro-processor checks whether there is a waiting period imposed by previous attempts to render the protected apparatus operable by means of an invalid card. If there is a waiting period, the security system waits for the specified amount of time. After the delay the DISPLAY shows the numerical keypad and the message: "Type in security code". Subsequently, (in block 10) the micro-processor checks if the manually entered security code is correct. If it is not, then in block 15 the waiting period is increased: if there was no waiting period it is set to, for example, 1 minute, and otherwise it is doubled. The DISPLAY shows the message: "Security code not correct". The security system then returns to block 9. If the manually entered security code in block 10 is correct, then in block 11 the waiting period is reset to zero. The user cards of a system may also contain the system code. However, they can not be used to change the security code. In block 12 it is checked whether the system code on the inserted card is correct too. If it is, then in block 13 (optionally) the writing means W write the correct manually entered security code onto the inserted card. In this case the user has entered a card with the correct system code and an invalid security code, but has manually entered the correct security code afterwards. So the user is authorized, because he knows the currently valid security code, which differs from the security code on his card. It is, therefore, useful to change the security code on his card into the currently valid code by means of the writing means W. Subsequently, in block 14, the microprocessor generates the signal that renders the apparatus to which the control device is connected operable. If it is found in block 12 that the system code on the inserted card is not correct, then the user has inserted a card belonging to another security system. However, the user knows the security code and is, therefore, authorized to operate the protected apparatus. So in this case too, the security system proceeds to block 14. In the blocks 8 and 14 (start up of the protected apparatus) any user-specific apparatus settings stored on the smart card will be transferred to the apparatus by the microprocessor.

For security reasons initially the user cards do not contain a security code. By means of the unique system card a security code can be entered into the system. Each user card can be used after the valid security code has been entered.

The security system according to the invention can be used to protect a car radio, a car telephone, a whole car, or any other apparatus. The system is particularly useful to protect apparatus which are to be used by temporarily authorized users, like cars of a car rental company. Another example: in a family the father keeps the unique system card for his car in his safe. He, his wife and their 18-year old son each have their own user card. The father can exclude his son from driving the car by changing the security code and only telling his wife the new code. He can also lend his car to a friend or a neighbour; if this person has a similar security system, he can use the user-specific apparatus settings on his own smart card for the car he borrowed, provided he knows the valid security code. If the person does not have a similar system of his own, the father can give him a user card with the security code. After the car is returned, the father can change the security code by means of his unique system card. If someone loses his user card, unauthorized use of the protected apparatus can easily be counteracted by changing the security code.

We claim:

1. A method for validating a security data carrier in a secured apparatus comprising executing the following steps in the secured apparatus
   a) first receiving a system security data carrier bearing a system security code;
   b) second receiving a command to change a lower level security code, stored in the secured apparatus, to a new code during engagement of the system security data carrier;
   c) third receiving a lower level security data carrier bearing a security code which is not the new code;
   d) taking manual input of the new code during engagement of the lower level security data carrier;
   e) changing the security code on the lower level security data carrier to the new code in response to the manual input; and
   f) activating the secured apparatus in response to the manual input.

2. The method of claim 1 further comprising the steps of, between the third receiving step and the taking step
   i) taking manual input of an erroneous code; and
   ii) implementing a wait time.

3. The method of claim 2 further comprising the steps of
   iv) iterating steps ii) and iii) until the new code is manually inputted; and
   v) increasing the wait time with each iteration.

4. The method of claim 3 wherein the increasing step includes doubling the wait time.

5. The method of claim 1 wherein the secured apparatus is a motor vehicle.

6. The method of claim 1 further comprising the step of excluding a lower level data carrier holder from using the apparatus by failing to inform the user of the new code.

7. The method of claim 1 further comprising the step of verifying that the system security code is present on the lower level security data carrier.

8. Secured apparatus including a device for validating a security data carrier comprising
   a) means for receiving
      a system security data carrier bearing a system security code;
      a command to change a lower level security code, stored in the secured apparatus, to a new code during engagement of the system security data carrier; and a lower level security data carrier bearing a security code which is not the new code;

manual input of the new code during engagement of the lower level security data carrier;

b) means for changing the security code on the lower level security data carrier to the new code in response to the manual input; and c) means for activating the secured apparatus in response to the manual input.

9. The apparatus of claim 8 further comprising means for implementing a wait time, in response to receiving an erroneous code from the lower level security data carrier; and wherein the means for receiving takes manual input of a further code after termination of the wait time.

10. The apparatus of claim 9 further comprising means for iteratively controlling the means for implementing and the means for receiving to take further codes until the new code is received and to increased the wait time with each iteration.

11. The apparatus of claim 10 wherein the wait time is doubled with each iteration.

12. The apparatus of claim 9 wherein the secured apparatus is a motor vehicle.

13. The apparatus of claim 9 further comprising means for excluding a lower level data carrier holder from using the apparatus by failing to inform the user of the new code.

14. The apparatus of claim 9 further comprising the step of verifying that the system security code is present on the lower level security data carrier.

15. A security system as claimed in claim 9, wherein said data carrier contains data representing user-specific apparatus settings.

* * * * *